US005388698A

United States Patent [19]

Wakao

[11] Patent Number: 5,388,698

[45] Date of Patent: Feb. 14, 1995

[54] POCKET CARRIER FOR DISPENSING PRODUCTS IN PRECISE QUANTITITES

[76] Inventor: Hiroshi Wakao, 3-151 Onada Cho, Tajimi-shi, Gifu Ken, Japan, 507

[21] Appl. No.: 3,296

[22] Filed: Jan. 12, 1993

[51] Int. Cl.[6] ........ B65D 83/04; B65G 59/00

[52] U.S. Cl. ........ 206/536; 206/499; 206/537; 221/281

[58] Field of Search ........ 206/535-537, 206/499; 221/267, 279, 307, 281

[56] References Cited

U.S. PATENT DOCUMENTS

| | | | |
|---|---|---|---|
| D. 137,496 | 3/1944 | Lustig | 206/537 X |
| 940,797 | 11/1909 | Frazer . | |
| 1,080,633 | 12/1913 | Husch et al. . | |
| 1,451,775 | 4/1923 | Husch et al. . | |
| 2,753,582 | 7/1956 | Fredericks . | |
| 2,788,891 | 4/1957 | Taylor | 206/536 |
| 3,236,369 | 2/1966 | Moore | 206/536 X |
| 3,308,962 | 3/1967 | Bryant | 206/499 X |
| 4,119,231 | 10/1978 | Johnson | 206/499 X |
| 4,346,495 | 8/1982 | Lin . | |
| 4,353,481 | 10/1982 | Tondo | 206/499 X |
| 4,854,761 | 8/1989 | Smith et al. . | |
| 5,118,007 | 6/1992 | Lewis et al. | 221/281 X |

FOREIGN PATENT DOCUMENTS

| | | |
|---|---|---|
| 2210931 | 9/1973 | Germany . |

*Primary Examiner*—Bryon P. Gehman

[57] ABSTRACT

A carrier/dispenser includes an outer container having openings at the top and at the bottom, and a removable cap that fits frictionally over the top opening. Inside the container is a plurality of units, each unit including a capsule that nests or interfits frictionally atop the other capsules inside the container. Each of the capsules is adapted to receive and hold a discrete, precise quantity of a desired powdered or solid substance such as a pill or tablet.

8 Claims, 7 Drawing Sheets

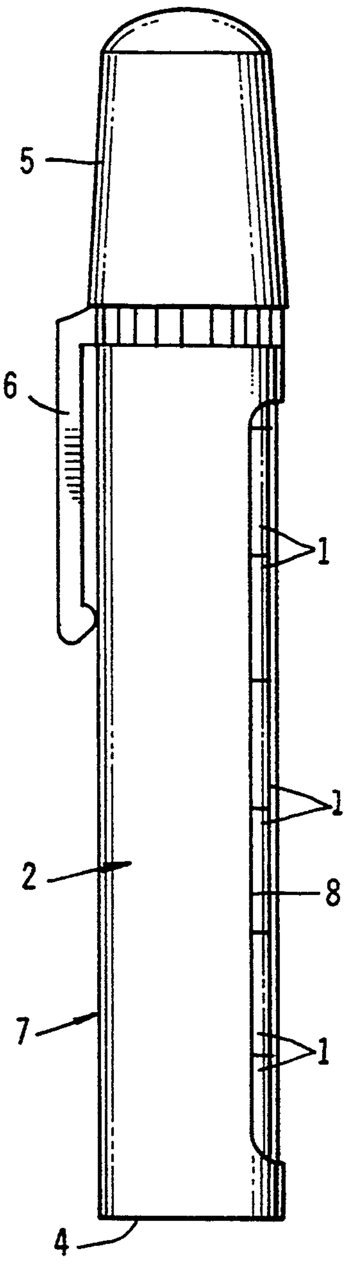
FIG. 1
FIG. 2
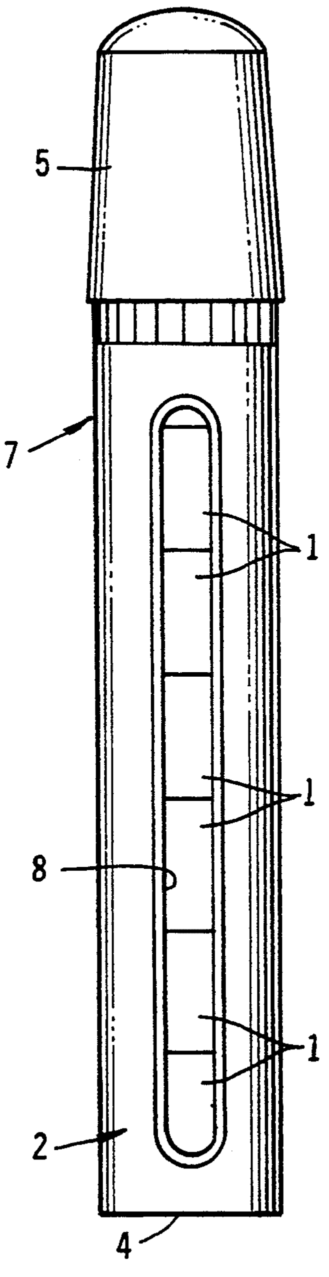
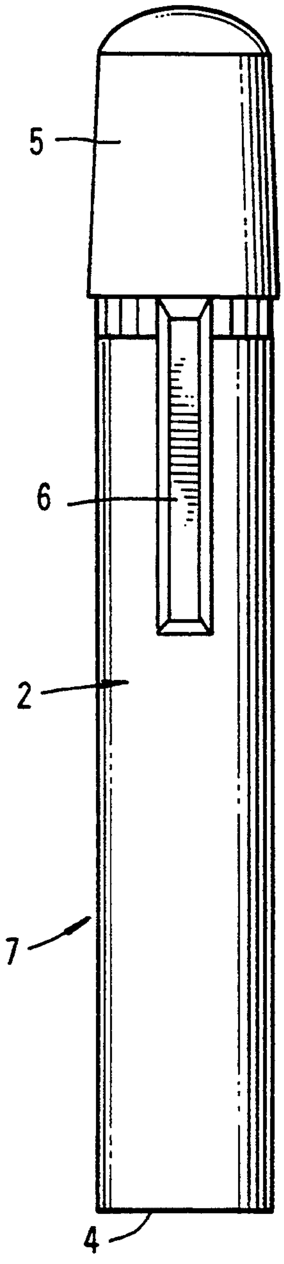
FIG. 3
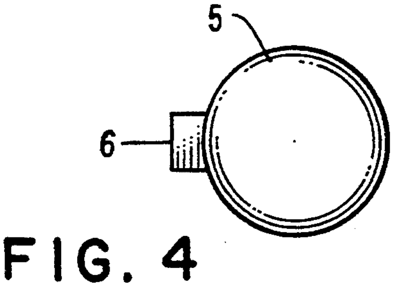
FIG. 4
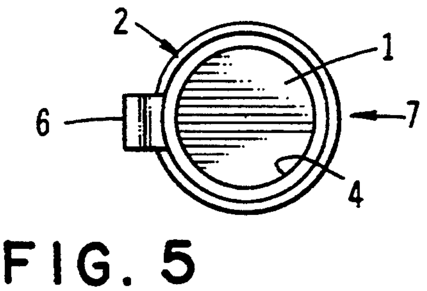
FIG. 5

FIG. 9
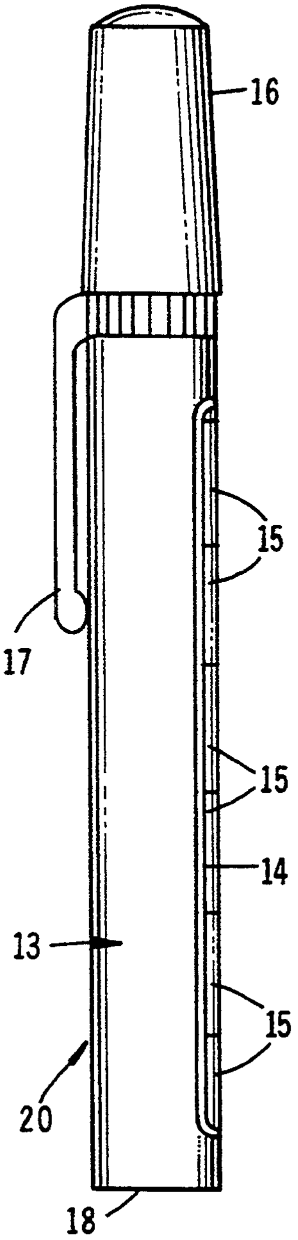
FIG. 10
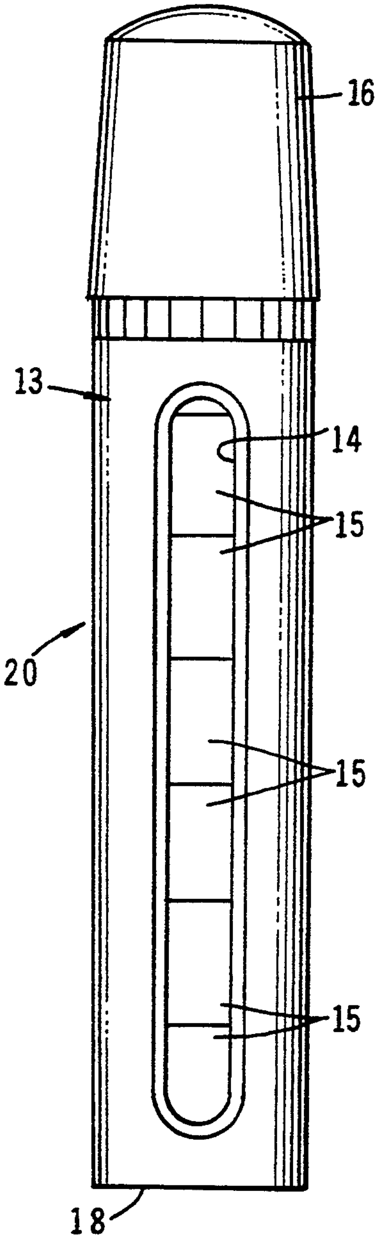
FIG. 13
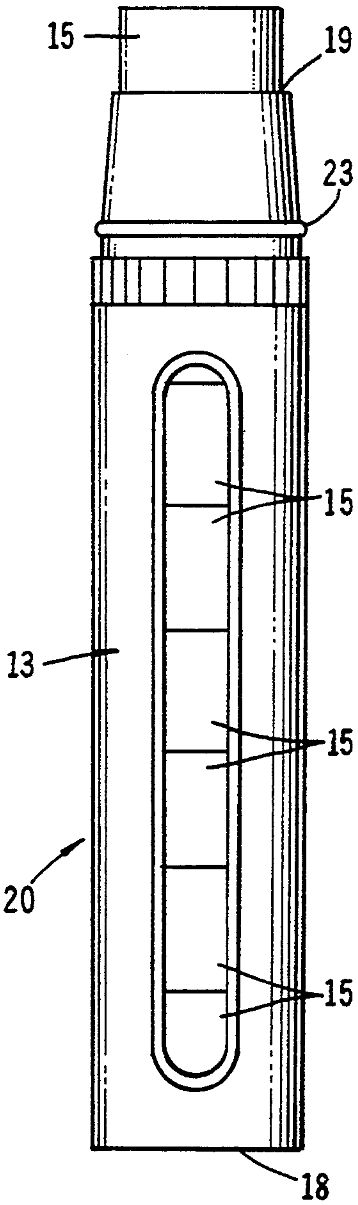
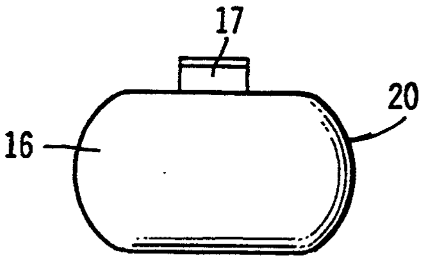
FIG. 11
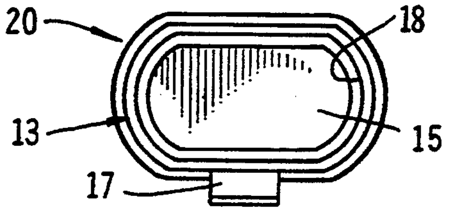
FIG. 12

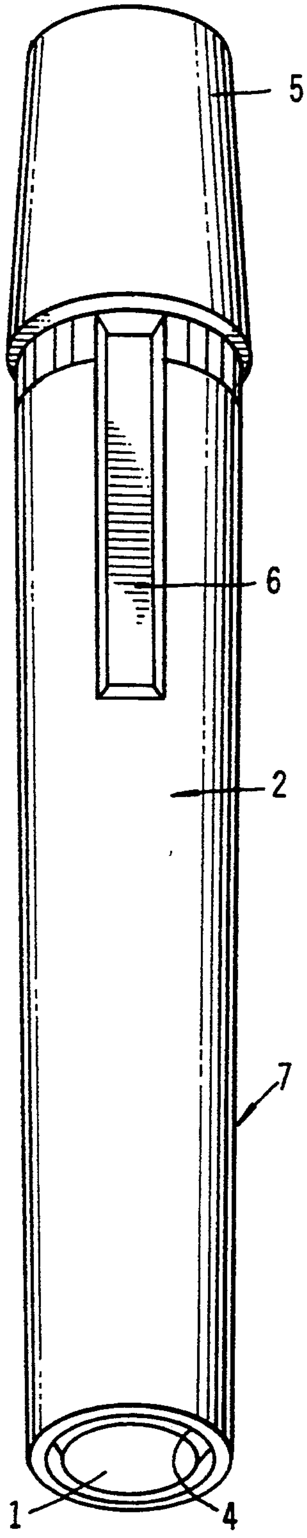
FIG. 19
FIG. 20
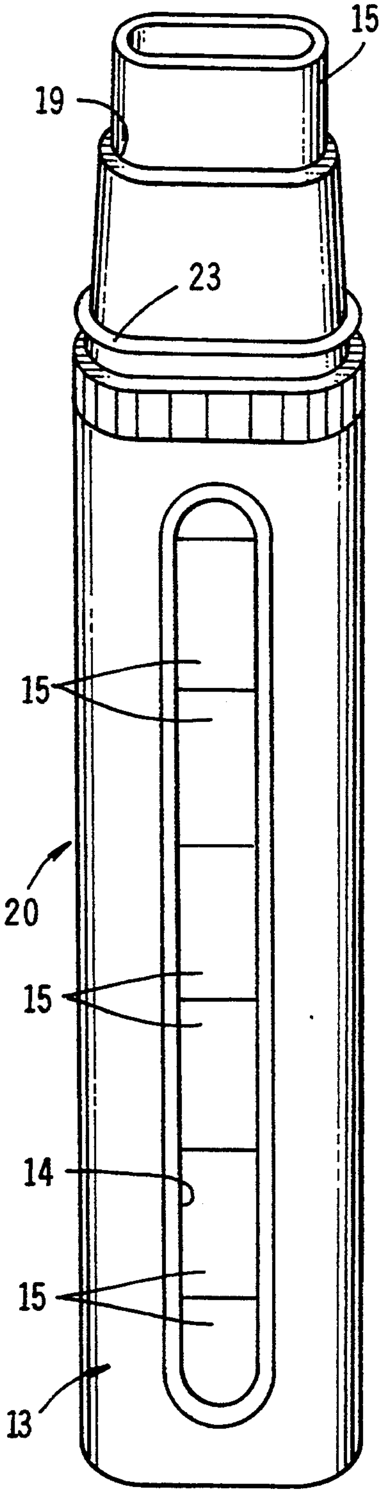
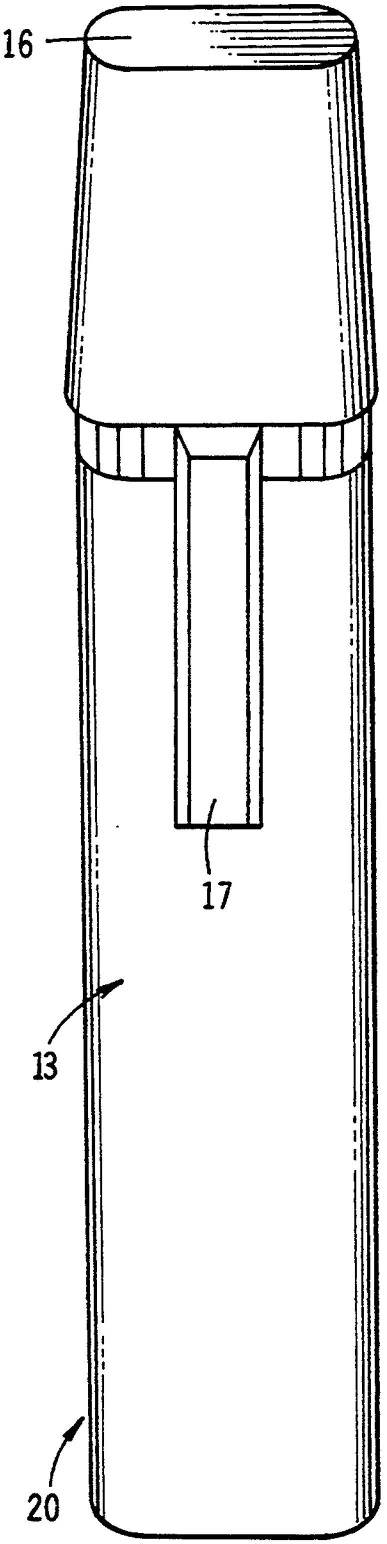
FIG. 21

POCKET CARRIER FOR DISPENSING PRODUCTS IN PRECISE QUANTITITES

This invention relates to a pocket-sized carrier for carrying and dispensing products such as pills, tablets and other solid or powdered substances, in precise, discrete quantities.

At present, many individuals carry a plurality of containers for products in the form of tablets, pills or powders, such as medicines, soups, soaps, coffee or tea. In many situations, the user must try to dispense such products from such containers under circumstances that lead to spillage or loss of the products from the containers.

The carrier/dispenser holds and dispenses discrete quantities of products in the form of tablets, pills and powders in precise quantities, and with a minimum of spillage or inconvenience. This carrier/dispenser includes an outer, preferably cylindrical-shaped or oval-shaped container. Within this outer container is a plurality of capsules, stacked, and preferably interfitting, one atop or within the other. Each of these capsules is of a size and shape to fit snugly within the outer container, but is sufficiently movable within the container so that a user can move one of the capsules upwardly to an opening at the top of the outer container by pushing upwardly from the bottom of the stack of capsules inside the container. Each of these capsules has a size and shape sufficient to carry a discrete, desired quantity of a desired product such as tablets, pills or powders.

In preferred embodiments, the carrier/dispenser is cylindrical-shaped or oval-shaped in cross-section; is pocket-sized; and optionally includes a clip on the cap or on the container for holding the carrier/dispenser in a pocket.

BRIEF DESCRIPTION OF THE DRAWINGS

FIGS. 1, 2 and 3 show a left side elevation view, front elevation view, and rear elevation view of a first embodiment of the carrier/dispenser, including a transparent window in the outer container for viewing capsules within the outer container, and a removable cap atop the outer cylindrical container;

FIGS. 4 and 5 show a top plan and a bottom plan view of the first embodiment shown in FIGS. 1–3;

FIGS. 9 and 10 show a left side elevation view and a front elevation view of a second embodiment of the carrier/dispenser, including a transparent window exposing the movable capsules inside the container, and a removable cap atop the container;

FIGS. 11 and 12 show top plan and bottom plan views of the second embodiment shown in FIGS. 9–10;

FIG. 13 shows a front elevation view of the second embodiment shown in FIGS. 9–12 with the cap removed from the outer container to expose a capsule at the top of the outer container;

FIGS. 16–19 show front/top, rear/top, front/bottom and rear/bottom perspective views of the first embodiment; and FIGS. 20–23 show front/top, rear/top, front/bottom and rear/bottom perspective views of the second embodiment.

DESCRIPTION OF THE PREFERRED EMBODIMENTS

Figure 6:
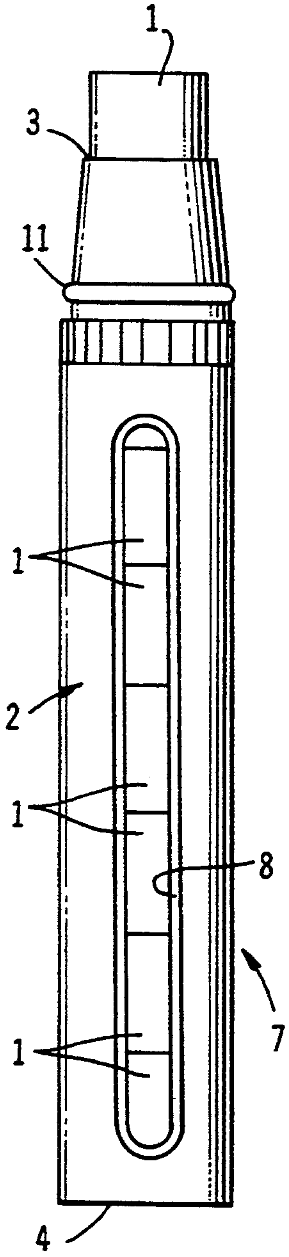
FIG. 6 shows a front elevation view of the first embodiment shown in FIGS. 1-5, but with the cap removed from the top of the container to expose one of the capsules at the top of the outer container.
Figure 7:
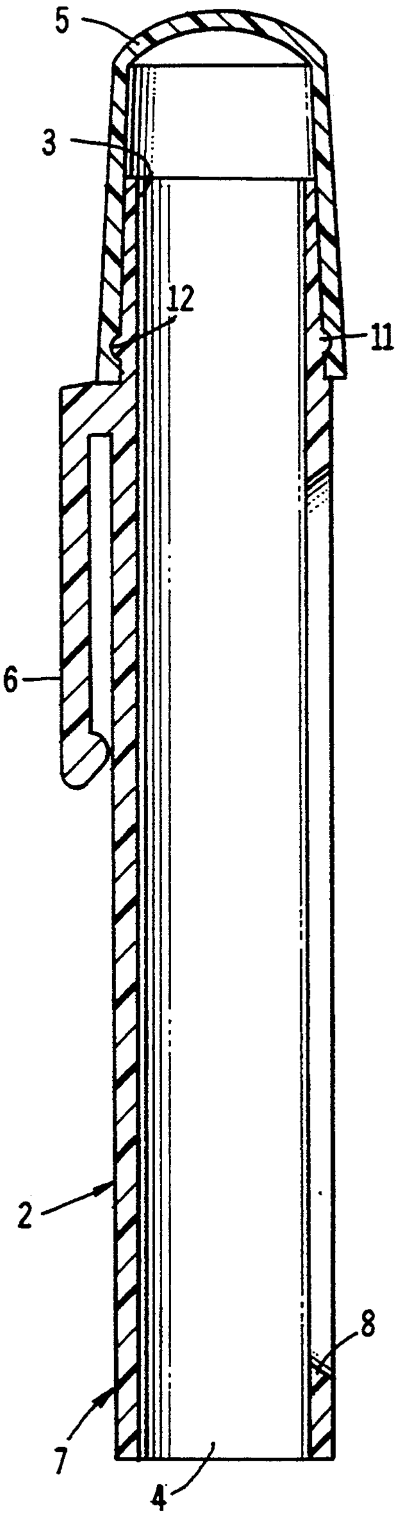
FIG. 7 shows a side elevation view in cross-section of the outer container in the first embodiment shown in FIGS. 1–6 with no capsules inside this container.

FIGS. 1–8 and 16–19 show a first embodiment 7 of the carrier/dispenser. Outer cylindrical container 2 has a top opening 3, a bottom opening 4, and a longitudinally-oriented, transparent window 8. Top opening 3 is covered with a removable cap 5. Container 2 is equipped with clip 6 for a user's convenience. Inside container 2 is a column or stack of interfitting cylindrical capsules 1, which are visible through window 8. Each capsule 1 contains a discrete, desired quantity of a desired tablet, pill or powder. Bottom opening 4 is provided for insertion of refilled or used capsules 1. Removing cap 5 exposes the contents of a capsule 1 for use. After such use, this capsule 1 is removed from container 2 via top opening 3 and inserted into container 2 through bottom opening 4. Inserting first capsule 1 into bottom opening 4 pushes another capsule 1 into top opening 3.

Figure 8:
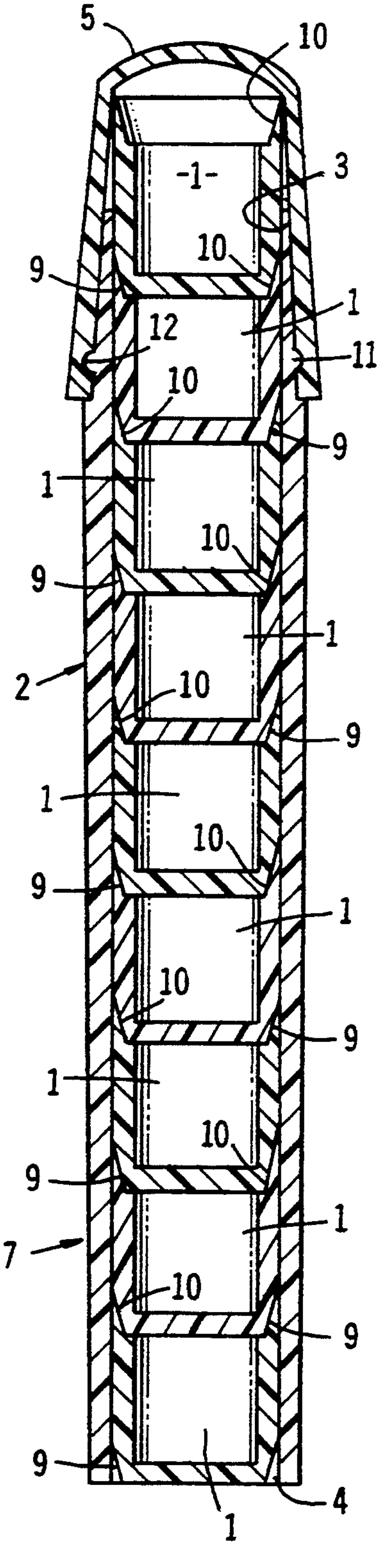
FIG. 8 shows a front elevation view of the first embodiment shown in FIGS. 1–7, showing the capsules inside the container in cross-section.
Figure 16:
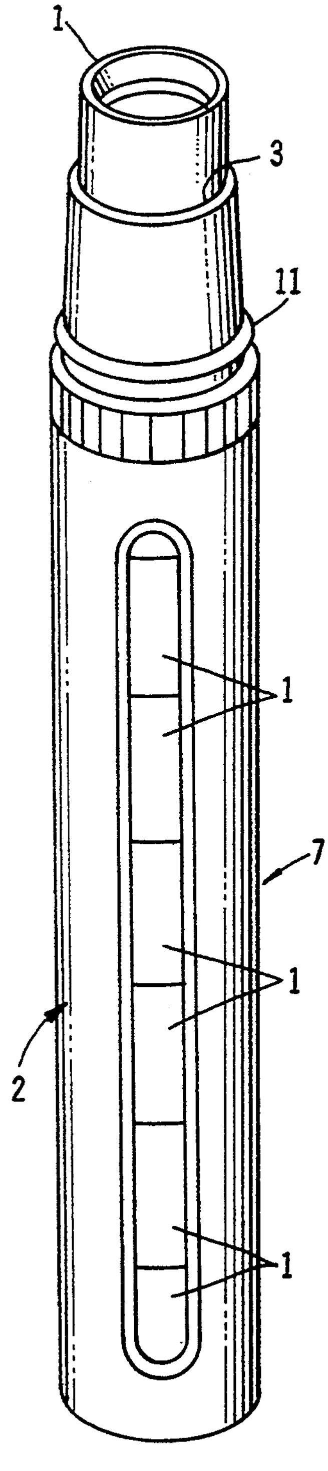
Figure 17:
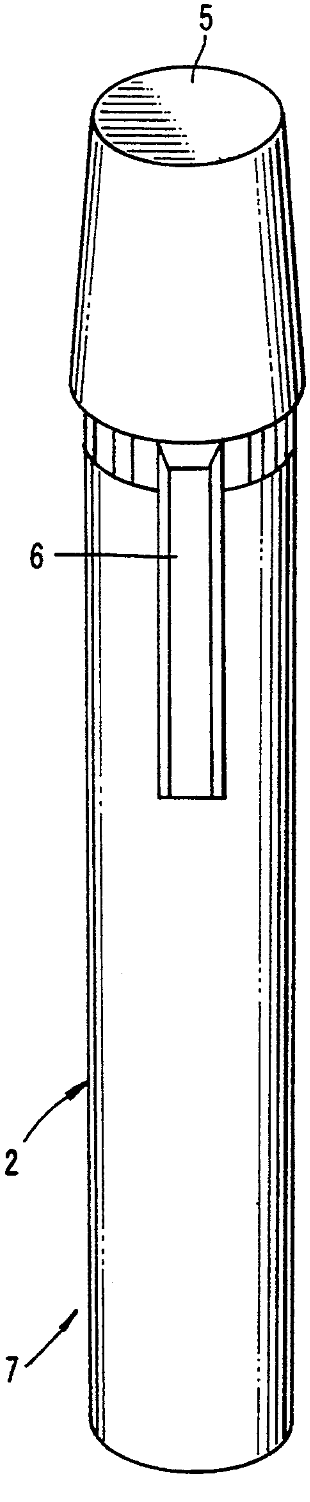
Figure 18:
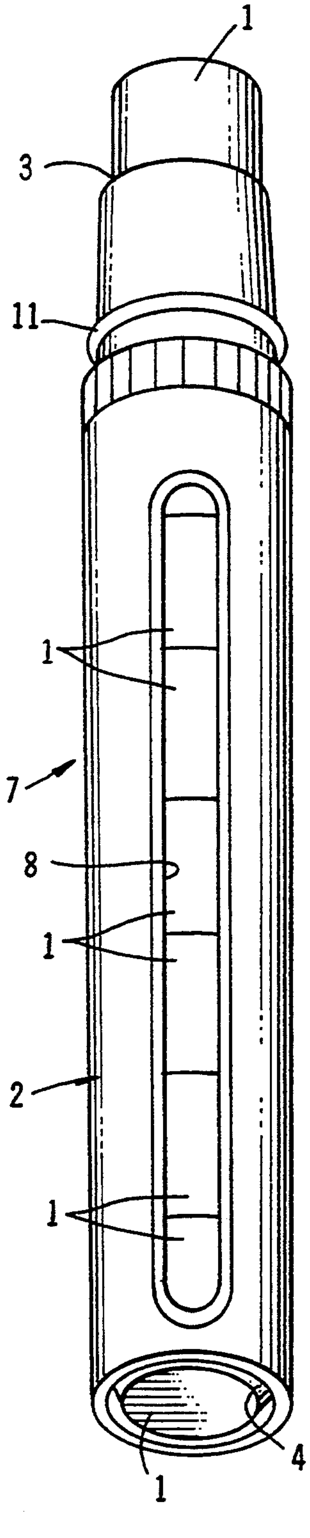
Figure 22:
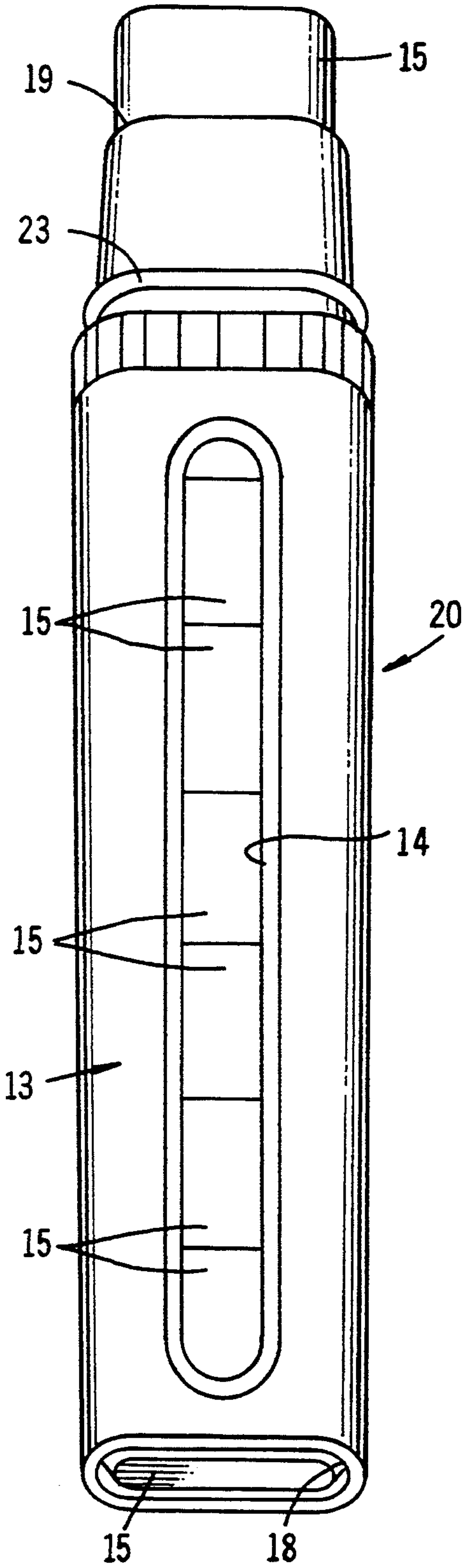
Figure 23:
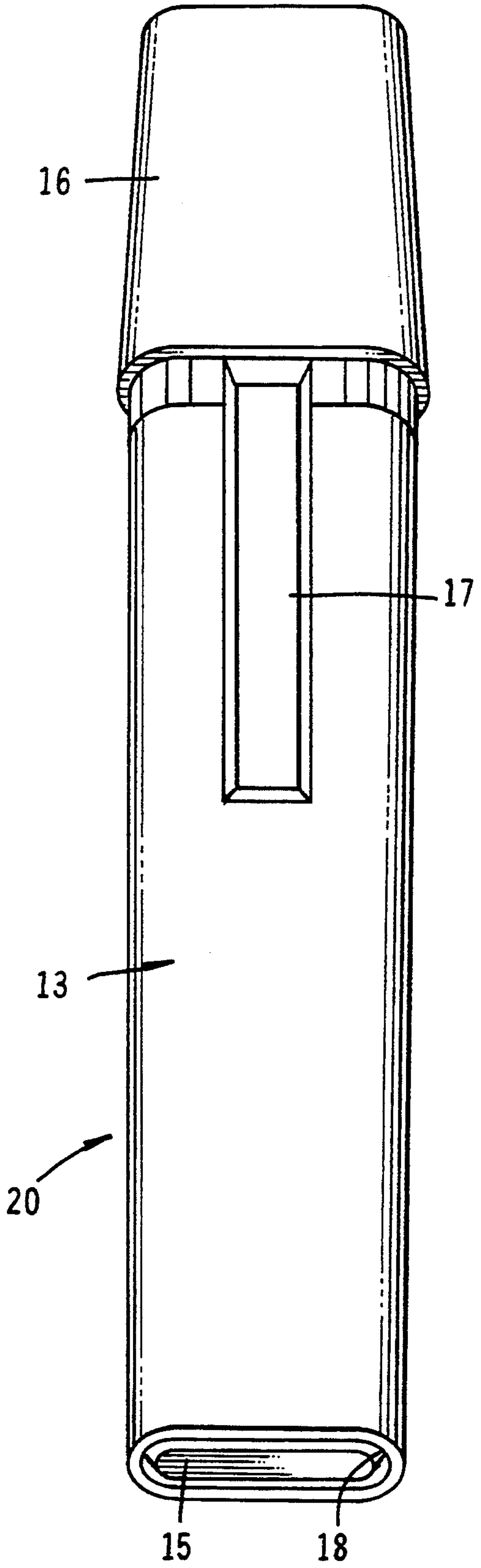

FIGS. 8 and 16 show in greater detail the configuration of capsules 1. Each of capsules 1 has, near its base, a frusto-conical section 9 that extends entirely around the sidewall of capsule 1. Section 9 interfits or nests in a complementary-shaped, chamfered section 10 extending around the inside wall near the top opening of each of capsules 1. Each of capsules 1 also has a cylindrical-shaped opening at the top.

FIG. 8 also shows that outer container 2 has, on its sidewall near top opening 3, an annular projection 11. Projection 11 fits into annular groove 12 on the inner wall of cap 5 to lock cap 5 in place atop outer container 2.

FIGS. 9–15 and 20–23 show a second embodiment 20 of the carrier/dispenser. Outer oval-shaped container 13 has a top opening 19, a bottom opening 18, and a longitudinally-oriented transparent window 14. Top opening 19 is covered with a removable cap 16. Container 13 is equipped with clip 17 for a user's convenience. Inside container 13 is a column or stack of interfitting, oval-shaped capsules 15, which are visible through window 14. Each capsule 15 contains a discrete, desired quantity of a desired pill, powder or tablet. Bottom opening 18 is provided for insertion of refilled or used capsule 15. Removing cap 16 exposes the contents of a capsule 15 for use. After such use, this capsule 15 is removed from container 13 via opening 19 and inserted into container 13 through bottom opening 18. Inserting a first capsule 15 into bottom opening 18 pushes another capsule 15 into top opening 19.

Figure 14:
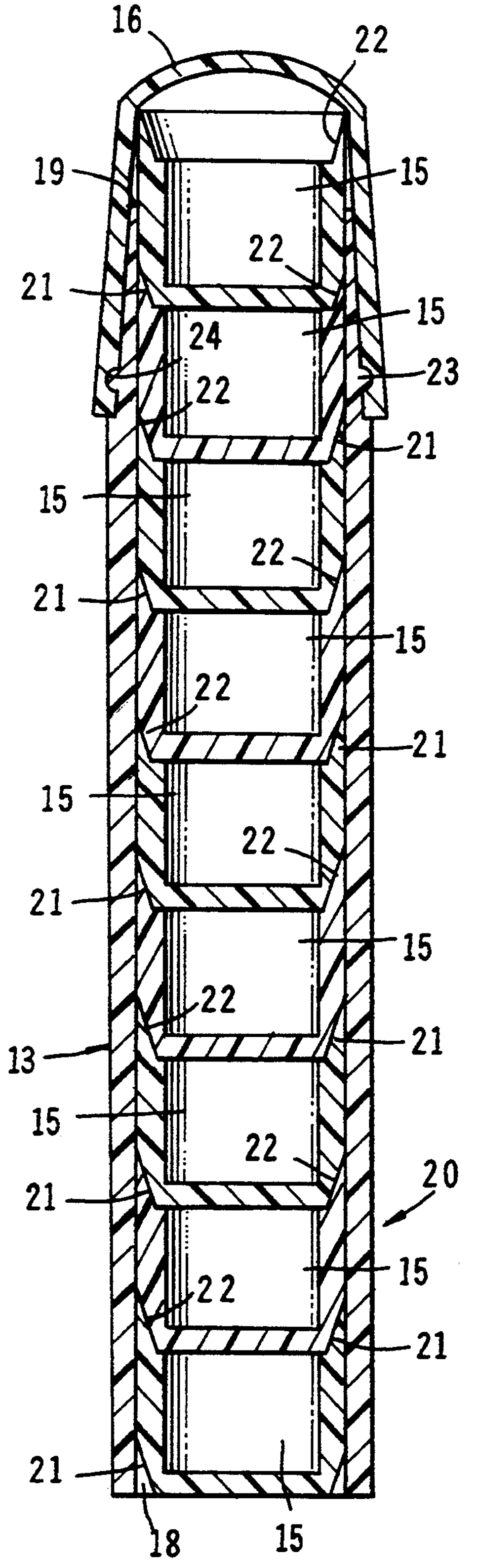
FIG. 14 shows a front elevation view in cross-section of the second embodiment in FIGS. 9–12, with the internal capsules also shown in cross-section.
Figure 15:
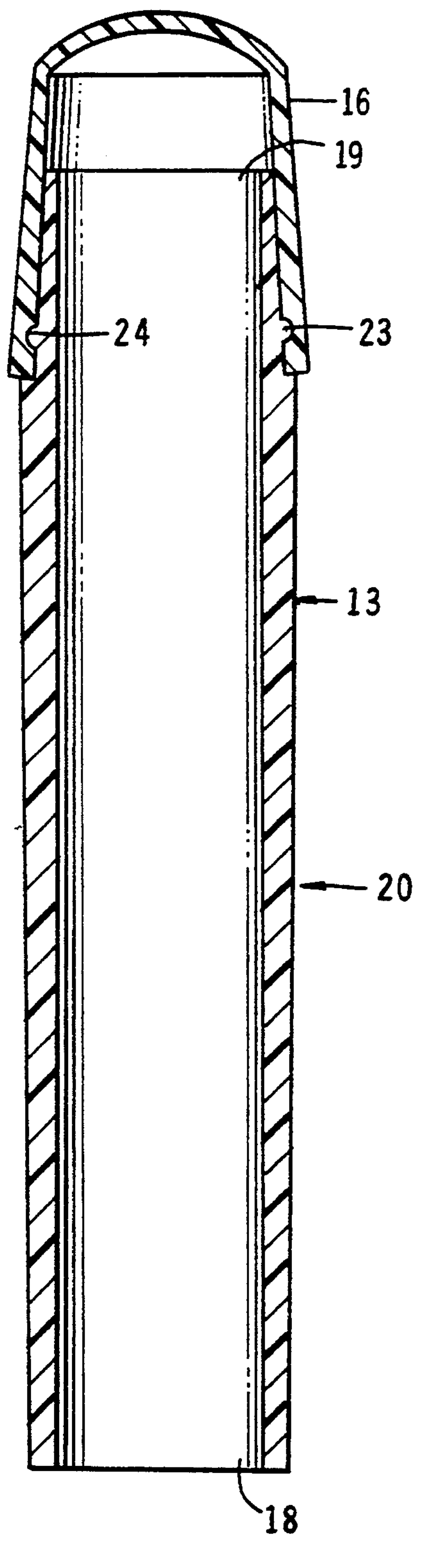
FIG. 15 shows a front elevation view of the outer container in the second embodiment with the internal capsules not present.

FIGS. 14 and 20 show in greater detail the configuration of capsules 15. Each of capsules 15 has, near its base, a frusto-conical section 21 that extends entirely around portion of the sidewall of capsule 15. Section 21 interfits or nests in a complementary-shaped, chamfered section 22 extending around the inside wall near the top opening of each of capsules 15. Each of capsules 15 also has an oval-shaped opening at the top.

FIG. 14 also shows that outer container 13 has, on its sidewall near top opening 19, an annular projection 23. Projection 23 fits into annular groove 24 on the inner wall of cap 16 to lock cap 16 in place atop outer container 13.

A user places into each capsule 1 or 15 a discrete, desired quantity of a desired pill, powder, or tablet. After the user removes the contents of topmost capsule 1 or 15, capsule 1 or 15 is removed via top opening 3 or 19, and inserted into container 2 or 13 via bottom opening 4 or 18. By so doing, the user pushes a second capsule 1 or 15 into top opening 3 or 19, while saving the first capsule 1 or 15 for reuse.

The carrier/dispensers of this invention, in preferred embodiments, are small, lightweight, and easily carried in pocket or purse. The capsules can be uniform in size and shape, or can differ in size and shape to accommodate a variety of products in a single carrier/dispenser. The carrier/dispenser opens readily, and readily dispenses discrete, desired quantities of pills, powders, or tablets, at virtually any time or place.

The carrier/dispensers, including the outer container, the removable cap, and each of the capsules, can be made of thermoplastic or thermosetting material by injection-molding, or of a metal, or some combination of these materials. Though the preferred embodiments are shown as cylindrical and oval in shape, the container, cap and/or capsules could take other shapes such as triangular and square.

What is claimed is:

1. A dispenser includes an outer container having an elongated shape, said elongated shape having a first end and a second end, and a top opening at said first end, an inner wall and a removable cap for said first end; inside said container, a plurality of discrete, reusable capsules, said capsules fitting atop one another in a nesting relationship inside said container; at said second end of said container opposite said top opening, a bottom opening having a size and shape suitable for receiving therethrough said capsules in said nesting relationship, with each of said capsules fitting frictionally against the inner wall of said container with sufficient force to prevent said capsules from falling out of said container, each of said capsules having a size and shape sufficient to receive and hold a discrete, desired quantity of a desired powdered or solid substance each of said capsules being resusable such that each insertion of a refilled or used capsule into the bottom opening pushes another of said plurality of capsules into the top opening.

2. The dispenser of claim 1 wherein said outer container is cylindrical in shape, and each of said capsules is cylindrical in shape.

3. The dispenser of claim 1 wherein said outer container is ovoid in shape, and each of said capsules is ovoid in shape.

4. The dispenser of claim 1 wherein each of said capsules is made of an injection-molded plastic, and said outer container is made of an injection-molded plastic.

5. A dispenser includes an outer container having an elongated shape, said elongated shape having a first end and a second end, an inner wall and a top opening at said first end; inside said container, a plurality of discrete, reusable capsules, each capsule being adapted to fit atop another capsule; at said second end of said container opposite said top opening, a bottom opening having a size and shape suitable for receiving said capsules therethrough, with each of said capsules fitting frictionally against the inner wall of said container with sufficient force to prevent said capsules from falling out of said container, each of said capsules having a size and shape sufficient to receive and hold a discrete, desired quantity of a desired powdered or solid substance each of said capsules being resusable such that each insertion of a refilled or used capsule into the bottom opening pushes another of said plurality of capsules into the top opening.

6. The dispenser of claim 5 wherein said outer container is cylindrical in shape, and each of said capsules is cylindrical in shape.

7. The dispenser of claim 5 wherein said outer container is ovoid in shape, and each of said capsules is ovoid in shape.

8. The dispenser of claim 5 wherein each of said capsules is made of an injection-molded plastic, and said outer container is made of an injection-molded plastic.

* * * * *